United States Patent [19]
Langseth et al.

[11] Patent Number: 6,001,316
[45] Date of Patent: Dec. 14, 1999

[54] METHOD FOR TREATMENT OF WASTE MATERIAL AND RECOVERING MGCL$_2$

[75] Inventors: Birger Langseth, Porsgrunn, Norway; Jean Béliveau; Bernard Perreault, both of Québec, Canada

[73] Assignee: Norsk Hydro ASA, Olso, Norway

[21] Appl. No.: 08/993,576

[22] Filed: Dec. 18, 1997

[30] Foreign Application Priority Data

Dec. 18, 1996 [NO] Norway ..................................... 965437

[51] Int. Cl.$^6$ ..................................................... C01F 5/30
[52] U.S. Cl. ........................... 423/163; 423/497; 423/158
[58] Field of Search ................................ 423/497, 156, 423/158, 160, 161, 163

[56] References Cited

U.S. PATENT DOCUMENTS 3,661,737  5/1972  Scherer ................................. 205/405
4,385,931  5/1983  Wallevik et al. ......................... 75/601
5,439,563  8/1995  Sivilotti ................................... 205/404

OTHER PUBLICATIONS

Perry et al "Handbook of Inorganic Compounds", pp. 19–20, 1995 (no month).

*Primary Examiner*—Ngoc-Yen Nguyen
*Attorney, Agent, or Firm*—Wenderoth, Lind & Ponack L.L.P.

[57] ABSTRACT

Method of treatment of environmentally hazardous waste material and recovering MgCl$_2$ brine, based on dissolving of the waste material in water and hydrochloric acid and simultaneous removal of ammonia at elevated temperatures, destruction of residual aqueous ammonia and removal of Mn, where the material is pre-treated in a special mixing unit adding water to provide a slurry and where hydrogen and other evolved gases are continuously diluted.

4 Claims, 2 Drawing Sheets

METHOD FOR TREATMENT OF WASTE MATERIAL AND RECOVERING MGCL$_2$

BACKGROUND OF THE INVENTION

1. Field of the Invention

The present invention relates to a method of treatment of an environmentally hazardous waste material from production of magnesium metal, and also an apparatus for such treatment.

2. Description of the Related Art

The actual waste material from electrolyic production of Mg metal and sludge deposit from (foundry) furnaces for refining of magnesium, being a solidified mixture of chlorides, oxides (salts) and Mg metal, represents a hazardous waste deposit. The present practice of free deposits in open air will not be tolerated by regulation in most countries.

Presently known methods of "treatment" of such waste material are mainly limited to the recovery of entrapped organic particles with free deposits of the remaining salts or return of salts to the source of the Mg containing raw material (salt lakes).

BRIEF SUMMARY OF THE INVENTION

Accordingly, it is an object of the present invention to provide an environmentally acceptable method of treatment of the waste material resulting in recovery of MgCl$_2$ content remaining after separation of metallic Mg and deposit of non-hazardous waste residue.

Another object of the present invention is to provide an apparatus allowing for an economical and non-polluting way of recovery of the useful compounds of the waste material.

These and other objects of the present invention are achieved by provision of a new and inventive method of waste treatment and a new apparatus, wherein the method is for treatment of environmentally hazardous waste material from production of magnesium and recovering MgCl$_2$ brine, comprising steps of disintegration of solid waste material and recovery of the entrapped Mg-metal particles, dissolving of the remaining waste material in water and hydrochloric acid and simultaneous removal of ammonia at elevated temperatures (in excess of 80° C.), precipitation of impurities in the resulting solution by adding chemicals and adjusting of pH in a manner known per se, destruction of residual aqueous ammonia and removal of Mn and separation of filtrated MgCl$_2$-brine, where prior to the dissolving step the disintegrated material is pre-treated in a special mixing unit adding water to provide a slurry and where hydrogen and other gases evolved in the dissolving step are continuously diluted; and the apparatus comprises a longitudinally extending and vertically arranged mixing unit (1) provided with a solid material inlet (24), an axially arranged air inlet (25) and a tangential water inlet (26).

BRIEF DESCRIPTION OF THE DRAWINGS

The method of waste treatment and the special apparatus developed in accordance with the present invention will be readily understood and apparent from the following detailed description of the invention referring to the attached drawings, FIGS. 1 and 2, where.

DETAILED DESCRIPTION OF THE INVENTION

Figure 1:
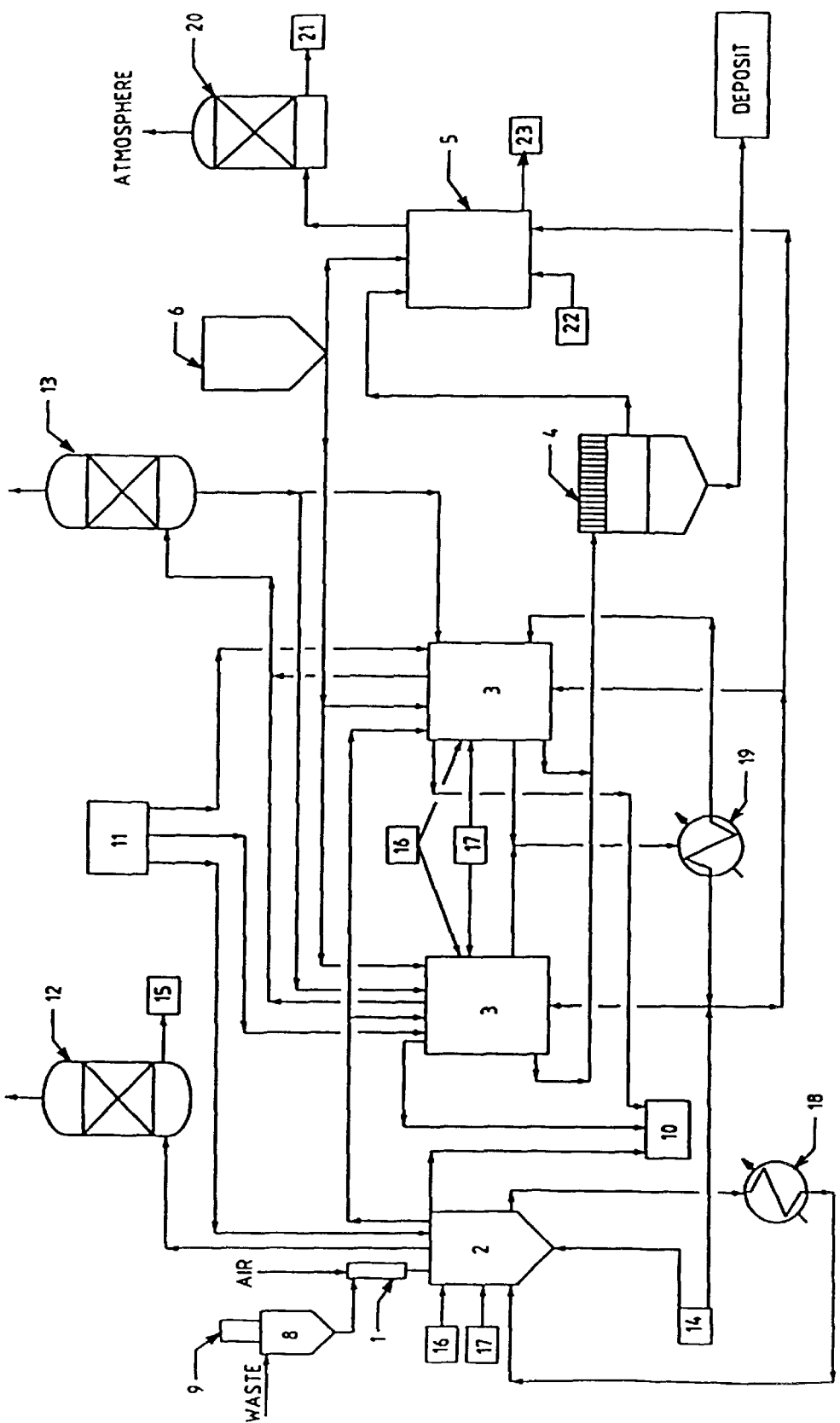
FIG. 1 shows schematically a flow chart diagram illustrating steps in the present method.
Figure 2:
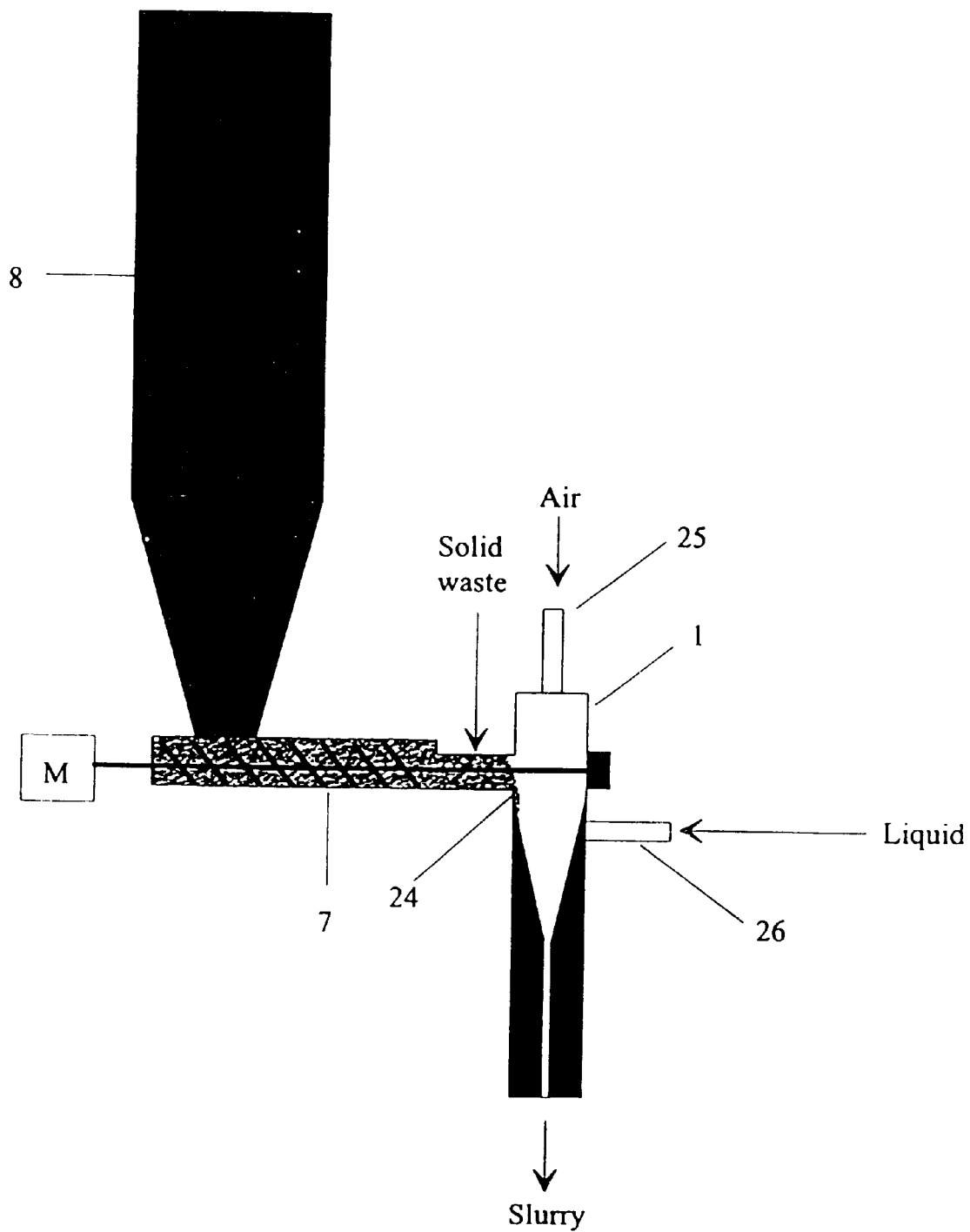
FIG. 2 is a schematic partial cross-sectional view of a pre-treatment step/mixing unit applied in a preferred embodiment of the apparatus according to the invention.

Referring to the Figures, and particularly to FIG. 1 illustrating a lay-out of the applied pilot plant, the hazardous disintegrated waste material, after separation of Mg-metal particles (not shown in the Figure), is pneumatically transported to the feeding bin 8. Dust is collected in the bag filter 9. Good flow pattern is ensured from the feeding bin, having an advantageous configuration of the cone exceeding 60° and tangential inlet of solids in order to avoid material segregation. Details of the feeding/mixing unit 1 are illustrated in FIG. 2. The screw feeder 7, transporting material from the bin 8 to a mixing unit 1, is provided with a moving plug in order to prevent humid air from plugging the system. The longitudinally extending and vertically arranged mixing unit 1 is provided laterally with a solid material inlet 24, an axially arranged dry air inlet 25 and a tangential water inlet 26. Dry air and recirculated water are used in the mixing unit 1 in order to ensure good mixing and avoiding scaling problems. The resulting waste mixture (slurry) is batchwise fed to the primary reactor 2, where water 16 and hydrochloric acid from tank 14 are added, reacting with the slurry under formation of MgCl$_2$ brine. Steam is used as stripping gas in reactor 2 to remove a major part of ammonia from the brine already at this stage of the process. The thermal decomposition of ammonia is conducted at elevated temperatures, preferably exceeding 80° C. As shown in FIG. 1 a large amount of heated air 17 is used in the reactor to dilute the produced hydrogen in order to avoid danger of explosion/fire. The air is introduced close to the liquid surface in the centre of the reactor with air outlets located closer to the wall at the top of the reactor. All applied air is then washed in scrubber 12, and formed NH$_4$OH 15 is removed. In case of emergency, addition of NaOH is used to stop the chemical reactions, both here and also in adjacent secondary reactors 3, where three separate NaOH-containers 11 and an overflow tank 10 to collect the reaction product are provided for this purpose. Due to the heat developed in reactor 2 as a result of the brine formation reaction a cooling system 18 is required.

Two secondary reactors 3 are in batch operation providing means for precipitation of impurities and adjusting of pH applying HCl and MgO, respectively. MgO from bin 6 must be well mixed in a flushing pot (not shown in the Figure) using recirculated cooled brine before being fed into the secondary reactor. The secondary reactors are equipped with the same hot air sweeping system 17 as in the case of the primary reactor, and the same emergency system 10,11 using NaOH to stop chemical reactions is provided. Also for the secondary reactors a cooling system 19 is required. The applied air is washed in scrubber 13, and a weak acid is recirculated to the secondary reactors.

Brine from the secondary reactors 3 enters filter 4 before the final treatment in reactor 5. The environmentally harmless filter cake from the filter goes to land deposit. Different chemicals (KMnO$_4$, chlorine) can be used for the final treatment in order to get rid of Mn and residual NH$_3$ (ammonia). All the above chemicals oxidize unwanted components and may be used, e.g. chlorine was successfully used in the pilot plant tests. However, due to the safety and environmental considerations, according to a preferred embodiment of the method a thermal decomposition of ammonia is used in reactor 2, removing more than 90% of NH$_3$, thus allowing one to use only KMnO$_4$ for the final treatment in reactor 5. Also in the final reactor addition of MgO and hydrochloric acid, respectively, can be used for pH adjustment for controlling the oxidizing reactions. Dilution of the evolved cooled gas is required here as well. The exhaust gas is washed using water, and the product from the scrubber 20 is weak acid collected in tank 21, which can be returned to either primary or secondary reactor when lowering of pH and dilution of the brine is required. The final brine 23 leaving the reactor 5 must first be filtrated before it can be used in the existing process for Mg-production (not shown in the Figure).

We claim:

1. Method of treatment of environmentally hazardous waste material, including solid waste material, from production of magnesium and recovering $MgCl_2$ brine, comprising steps of:
   (a) disintegrating the solid waste material, wherein said waste material contains an ammonia-generating substance, and recovering Mg-metal particles which were entrapped in said solid waste material,
   (b) dissolving the remaining waste material in water and hydrochloric acid to form a solution of $MgCl_2$ brine, wherein said dissolving is carried out under conditions to permit formation and simultaneous removal of a portion of ammonia at elevated temperatures in excess of 80° C.,
   (c) adding chemicals and adjusting the pH of the solution obtained from step (b) to precipitate the impurities contained therein and removing the precipitated impurities from the solution,
   (d) further adding chemicals to remove the residual ammonia and Mn from the solution obtained from step (c),
   (e) filtrating the solution obtained from step (d) to produce a filtrated $MgCl_2$ brine, wherein prior to the dissolving step the disintegrated waste material is pre-treated in a mixing unit by adding water to provide a slurry and wherein hydrogen and other gases evolved in the dissolving step are continuously diluted.

2. Method according to claim 1, wherein in step (b) thermal decomposition at elevated temperatures by means of heated air or steam stripping, and in step (d) addition of $KMnO_4$ are used to remove ammonia.

3. Method according to claim 1, where all chemical reactions are stopped immediately in case of emergency by adding NaOH.

4. Method according to claim 2, where all chemical reactions are stopped immediately in case of emergency by adding NaOH.

* * * * *